US006299995B1

(12) United States Patent
Abdo et al.

(10) Patent No.: US 6,299,995 B1
(45) Date of Patent: Oct. 9, 2001

(54) PROCESS FOR CARBON MONOXIDE PREFERENTIAL OXIDATION FOR USE WITH FUEL CELLS

(75) Inventors: Suheil F. Abdo, Lincolnshire; Cynthia A. DeBoy, Naperville; Geralyn F. Schroeder, Roselle, all of IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/584,316

(22) Filed: May 31, 2000

(51) Int. Cl.[7] ............................ H01M 8/04; C01B 31/20; C01B 31/18
(52) U.S. Cl. ...................... 429/17; 423/247; 423/437.2; 423/648.1; 423/652; 423/655
(58) Field of Search ................. 423/247, 437.2, 423/628, 648.1, 652, 655; 429/17

(56) References Cited

U.S. PATENT DOCUMENTS

| | | | |
|---|---|---|---|
| 2,620,314 | 12/1952 | Hoekstra | 252/448 |
| 3,102,919 | * 9/1963 | Hirschbeck et al. | 423/437.2 |
| 3,631,073 | 12/1971 | Cohn et al. | 252/373 |
| 4,522,894 | 6/1985 | Hwang et al. | 429/17 |
| 5,045,297 | * 9/1991 | Bonifaz et al. | 423/437.2 |
| 5,478,534 | * 12/1995 | Louise et al. | 423/247 |
| 5,494,568 | 2/1996 | Simpson et al. | 208/46 |
| 5,518,705 | * 5/1996 | Buswell et al. | 423/247 |
| 5,922,487 | 7/1999 | Watanabe et al. | 429/44 |
| 6,007,934 | 12/1999 | Auer et al. | 429/44 |
| 6,010,675 | 1/2000 | Trocciola et al. | 423/427 |
| 6,110,862 | * 8/2000 | Chen et al. | 423/628 |
| 6,168,772 | * 1/2001 | Watanabe | 429/17 |

FOREIGN PATENT DOCUMENTS

| | | |
|---|---|---|
| 0 955 351 | 10/1999 | (EP) . |
| 8295503 | 11/1996 | (JP) . |

OTHER PUBLICATIONS

Edmond C. Akubuiro et al, "Dispersion and Support Effects in Carbon Monoxide Oxidation Over Platinum", *Applied Catalysis,* 14 (1985) 215–227 (No month).*

Article Will Developing Countries Spur Fuel Cell Surge? by Rajindar Singh, *Chemical Engineering Progress,* Mar. 1999, pp. 59–66.

Article "Purifying Hydrogen by . . . Selective Oxidation of Carbon Monoxide" by Marion L. Brown, Jr. et al, *Industrial and Engineering Chemistry,* vol. 52, No. 10, Oct. 1960, pp. 841–844.

Article "Advanced PEFC Development for Fuel Cell Powered Vehicles" by Shigeyuki Kawatsu, *Journal of Power Sources 71* (1998), pp. 150–155. (No month).

* cited by examiner

*Primary Examiner*—Wayne Langel
(74) *Attorney, Agent, or Firm*—John G. Tolonei; Frank S. Molinaro; Richard P. Silverman

(57) ABSTRACT

Disclosed is a hydrogen generation process for use with fuel cells which includes a preferential oxidation step to reduce the concentration of carbon monoxide. The preferential oxidation step includes contacting a fuel stream comprising hydrogen and carbon monoxide in the presence of an oxygen at a preferential oxidation temperature of between about 70° and about 160° C. with preferential oxidation catalyst for reducing the concentration of carbon monoxide to produce a treated fuel gas stream comprising less than about 50 ppm-vol carbon monoxide. The preferential oxidation catalyst comprises ruthenium metal disposed on an alumina carrier having a low density and a high porosity. Superior performance at low preferential oxidation temperatures below 130° C. was observed when the alumina carrier contained a bimodal pore distribution with an average pore distribution of from about 20 to about 3000 angstroms. The preferential oxidation catalyst may be employed to reduce carbon monoxide in fuel gas streams supplied to fuel cells wherein carbon monoxide will poison the active noble metal membrane and higher preferential oxidation temperatures may reduce the hydrogen content of the gas stream.

12 Claims, No Drawings

PROCESS FOR CARBON MONOXIDE PREFERENTIAL OXIDATION FOR USE WITH FUEL CELLS

FIELD OF THE INVENTION

The present invention relates to a catalyst and a process for the selective oxidation of carbon monoxide. More particularly, the present invention relates to a catalyst and a process for the catalytic preferential oxidation of carbon monoxide in a fuel gas stream prior to the use of the fuel gas stream in a fuel cell.

BACKGROUND OF THE INVENTION

Fuel cells are in principle gas-operated batteries in which the energy obtained from the reaction of a fuel gas stream comprising hydrogen and oxygen is converted directly into electrical energy. The present invention describes the preparation of catalysts for preparation of the fuel gas stream for use in fuel cells, in particular for PEM (polymer electrode membrane) fuel cells. This type of fuel cell is becoming increasingly important, due to its high energy density and robust structure, for use in the vehicle industry, i.e. for providing electro-traction in motor vehicles.

The advantages of a vehicle powered by fuel cells are the very low emissions and the high degree of efficiency of the total system compared with conventional internal combustion engines. When hydrogen is the major component in the fuel gas, the primary emission product of the conversion in the fuel cell is water. The water is produced on the cathode side of the fuel cell. The vehicle is then a so-called ZEV (zero emission vehicle). The use of hydrogen in fuel cells requires that hydrogen be available on the anode side of the fuel cell membrane to actually generate power. The source of the hydrogen can be stationary or mobile. Stationary sources of hydrogen will require a distribution and dispensing system like motor gasoline. Mobile sources for hydrogen will include on-board hydrogen generators for the conversion of hydrocarbon fuels to hydrogen. However, hydrogen presents many handling and distribution problems which will not be resolved before the fuel cell powered vehicles reach the market. The infrastructure for the widespread distribution of hydrogen is still too expensive at the moment and there are other problems with the storage and refueling of vehicles. For this reason, the alternative, producing hydrogen directly on board the vehicle by reforming hydrocarbon fuels or oxygenated fuels is growing in importance. For example, methanol can be stored in a fuel tank of the vehicle and on demand converted by a steam reforming process at 200° to 300° C. to a hydrogen-rich fuel gas with carbon dioxide and carbon monoxide as secondary constituents. After converting the carbon monoxide by a shift reaction, preferential oxidation (prefox) or another purification process, this fuel gas, or reformate gas is supplied directly to the anode side of the PEM fuel cell. Theoretically, the reformate gas consists of 75 vol-% hydrogen and 25 vol-% carbon dioxide. In practice, however, the reformate gas also will contain nitrogen, oxygen and, depending on the degree of purity, varying amounts of carbon monoxide (up to 1 vol-%).

The PEM fuel cell comprises layers of catalyst comprising platinum and platinum alloys on the anode and cathode sides of PEM fuel cells. These catalyst layers consist of fine, noble metal particles which are deposited onto a conductive support material (generally carbon black or graphite). The concentration of noble metal is between 10 and 40 wt-% and the proportion of conductive support material is thus between 60 and 90 wt-%. The crystallite size of the particles, determined by X-ray diffraction (XRD), is about 2 to 10 nm. Traditional platinum catalysts are very sensitive to poisoning by carbon monoxide; therefore the CO content of the fuel gas must be lowered to <100 ppm in order to prevent power loss in the fuel cells resulting from poisoning of the anode catalyst. Because the PEM fuel cell operates at a relatively low operating temperature of between 70° and about 100° C., the catalyst is especially sensitive to CO poisoning.

Processes for the production of synthesis gas are well known and generally comprise steam reforming, autothermal reforming, non-catalytic partial oxidation of light hydrocarbons or non-catalytic partial oxidation of any hydrocarbons. Of these methods, steam reforming is generally used to produce synthesis gas for conversion into ammonia or methanol. In such a process, molecules of hydrocarbons are broken down to produce a hydrogen-rich gas stream. A paper titled "Will Developing Countries Spur Fuel Cell Surge?" by Rajinder Singh, which appeared in the March 1999 issue of *Chemical Engineering Progress*, page 59–66, presents a discussion of the developments of the fuel cell and methods for producing hydrogen for use with fuel cells and highlights one hybrid process which combines partial oxidation and steam reforming in a single reaction zone as disclosed in U.S. Pat. No. 4,522,894 which is hereby incorporated by reference.

U.S. Pat. No. 5,922,487 discloses an anode electrocatalyst for a fuel cell which depresses the poisoning of the noble metal fuel cell membrane. The anode electrocatalyst comprises an alloy essentially consisting of at least one of tin, germanium, and molybdenum, and one or more noble metals selected from platinum, palladium, and ruthenium.

U.S. Pat. No. 6,007,934 is concerned with the preparation of supported catalysts based on platinum and ruthenium disposed on the anode side of a PEM fuel cell which have a high resistance to poisoning by carbon monoxide. Carbon monoxide concentrations of more than 100 ppm in the reformate gas should be possible to employ in the fuel gas passed to the fuel cell without a noticeable drop in performance of the PEM fuel cell.

U.S. Pat. No. 6,010,675 discloses a method and apparatus for removing carbon monoxide from a fuel gas prior to use of the fuel gas in a fuel cell for the production of electric power. Catalysts for purifying hydrogen by selective oxidation of carbon monoxide using alumina supported platinum are disclosed in an article entitled "Purifying Hydrogen by . . . Selective Oxidation of Carbon Monoxide" by Marion L. Brown, Jr. et al, *Industrial and Engineering Chemistry*, Vol. 52, No. 10, October 1960, pp. 841–844. U.S. Pat. No. 6,010,675 discloses the problem of using a conventional preferential oxidation catalyst system in a hydrogen generator or fuel processor for producing a fuel gas stream for use in a fuel cell. The above mentioned article at page 842–3 indicated that the selective removal of carbon monoxide was feasible only within a certain temperature zone for all known selective oxidation catalysts with or without variation of the oxygen concentration, below which the oxygen reaction falls off. The critical temperature range for the effective preferential oxidation was identified as being above 130° C. (266° F.) and below 160° C. (320° F.). U.S. Pat. No. 6,010,675 and the above mentioned article are hereby incorporated by reference. The article stated that this narrow range of selectivity applied to a wide range of precious metal catalysts supported on aluminum oxide.

An article entitled "Advanced PEFC Development For Fuel Cell Powered Vehicles", by Shigeyuki Kawatsu, published in the *Journal of Power Sources*, Volume 71 (1998), pages 150–155, discloses that a ruthenium catalyst on alumina was found to be useful for reducing the carbon monoxide concentrations of reformed gas from methanol reforming over a wider operating temperature range than platinum based oxidation catalysts. Significant carbon monoxide conversion activity between about 100° and about 160° C. was disclosed.

European publication No. EP 0955351A1 discloses a CO-selective oxidation catalyst having metals including platinum and ruthenium disposed on an alumina carrier. The catalyst preparations included ruthenium metals on alumina pellets with ruthenium metal loadings up to 1.0 wt-%. EP 0955351A1 discloses that the active temperature range for ruthenium was about 160° to 180° C., and only when platinum was either alloyed with the ruthenium or when platinum was included on the alumina carrier was a desired active temperature below 160° C. achieved.

In order to achieve a balance between the reforming reaction zone and the high and low temperature water gas shift reaction zones of fuel processors, others have attempted to dispose these reaction zone in intimate thermal contact to minimize overall energy use. The addition of a preferential or selective oxidation zone to such an integrated system wherein the preferential oxidation catalyst requires effective operating conditions above the outlet conditions of the low temperature water gas shift reaction and above the temperature of the fuel cell operation creates a difficult engineering problem. On the reaction side, the increased temperature may result in hydrogen loss, and on the engineering side, heating the effluent form the water gas shift reaction zone to the favorable temperature range of the selective oxidation reaction and then cooling the selective oxidation effluent requires increased mechanical complexity, and increased equipment cost.

An object of the present invention is to provide preferential oxidation catalysts which have an improved conversion of carbon monoxide. It is an objective of the present invention to provide a preferential oxidation catalyst which operates effectively at conditions which are more favorable in reducing the carbon monoxide concentration in the fuel gas in fuel cell systems. It is an objective of the present invention to provide and, in particular, to achieve effluent concentrations of carbon monoxide of less than about 50 ppm-vol. Another object of the present invention is to provide stable catalysts suitable for the selective conversion of carbon monoxide while maintaining a reasonably high selectivity to the production of carbon dioxide without regeneration.

SUMMARY OF THE INVENTION

The present invention relates to a process for the production of a fuel gas for use in a fuel cell which is sensitive, and in fact, is poisoned by the presence of carbon monoxide in the fuel gas. The fuel gas is a hydrogen-rich stream resulting from the conversion of a hydrocarbon or an oxygenate to produce a synthesis gas which may contain up to about 2 mol-% carbon monoxide. Previously known catalysts for purification of hydrogen streams required more severe conditions than are present in fuel processors or than could be accommodated in a compact fuel processor and fuel cell arrangements. The problem solved by the present invention is a more active preferential catalyst which can reduce the concentration of carbon monoxide in the prefox effluent to less than about 50 ppm-vol at preferential oxidation conditions consistent with the operation of the fuel cell. More specifically, the preferential oxidation catalyst, or prefox catalyst, of the present invention effectively reduces the carbon monoxide in a hydrogen-rich fuel gas to concentration levels below 50 ppm-vol, at a wide range of preferential temperatures including temperatures below 180° C., and particularly below 160° C. Preferably the wide range of preferential oxidation temperatures includes temperatures between about 70° and about 130° C. The catalyst of the present invention was found to provide effective reduction of carbon monoxide from hydrogen-rich streams. Surprisingly, the catalyst performance was found to be dependent upon the selection of a suitable catalyst base. It was surprisingly discovered that an alumina base with a low density and a high porosity resulted in a superior performance.

In one embodiment, the present invention relates to a process for the generation of a hydrogen-rich fuel gas stream for use in a fuel cell for the generation of electric power. The process comprising passing a feed stream comprising a hydrocarbon or an oxygenate to a fuel processor. The fuel processor comprises an integrated reforming and water gas shift conversion zone to produce a fuel stream. The fuel stream comprises hydrogen, carbon monoxide, carbon dioxide, and water. The fuel stream at an effective oxidation temperature of between about 70° to about 160° C. and in the presence of an oxygen-containing stream is passed to a preferential oxidation zone. The preferential oxidation zone contains a preferential oxidation catalyst to produce the hydrogen-rich fuel gas stream comprising less than about 50 ppm-vol carbon monoxide. The preferential oxidation catalyst comprises ruthenium metal dispersed on an alumina carrier having a low density and a high porosity. The hydrogen-rich fuel gas stream is passed to a fuel cell for the generation of electric power and electric power is withdrawn.

In another embodiment, the present invention relates to a method for preparing a preferential oxidation catalyst to reduce the concentration of carbon monoxide in a hydrogen-rich fuel gas stream produced by a fuel processor for a fuel cell to generate electric power. The method for preparing the preferential oxidation-catalyst composition comprises impregnating an alumina carrier having a low density and a high porosity with a source of ruthenium metal to provide a ruthenium-containing composition with a ruthenium metal content of between about 0.5 and about 3 wt-% ruthenium metal, and reducing the ruthenium containing composition.

In a further embodiment, the present invention relates to a preferential oxidation process for the conversion of carbon monoxide. This process comprises passing a fuel stream comprising hydrogen, carbon monoxide, carbon dioxide and water in the presence of an oxygen-containing stream at oxidation conditions including a preferential oxidation temperature between about 70° and about 160° C. to a reaction zone. The reaction zone contains a preferential oxidation catalyst which comprises ruthenium metal disposed on an alumina carrier having a low density and a high porosity. The ruthenium metal comprises well dispersed ruthenium crystals having an average crystal size less than or equal to about 40 angstroms. A treated fuel stream comprising less than about 50 ppm-vol carbon monoxide is withdrawn from the preferential oxidation process.

DETAILED DESCRIPTION OF THE INVENTION

Generally, the feedstock to a preferential oxidation process using the catalyst of the present invention will comprise hydrogen, nitrogen, carbon monoxide, carbon dioxide, water, and light hydrocarbons and is typically derived from a combination of reforming and water gas shift reaction step. Some sulfur compounds including hydrogen sulfide and mercaptans may be present. The removal of sulfur from the hydrocarbon feedstock may be accomplished prior to the reforming and water gas shift steps by any conventional means including adsorption, chemisorption, and catalytic desulfurization. For compact fuel processors used with fuel cells, chemisorption with a material such as zinc oxide is preferred. The desulfurization operation will generally take place at effective conditions including a desulfurization pressure of between about 100 and about 1000 kPa. Preferably the desulfurization operation is carried out at a desulfurization pressure of between 200 and 300 kPa. Preferably the desulfurization operation is carried out at a desulfurization temperature less than about 300° C., and more preferably the desulfurization operation is carried out at a desulfurization temperature between about 50° and about 300° C. Preferably the concentration of sulfur in the desulfurized feedstock will be less than about 10 ppm-mol, and more preferably the concentration of sulfur in the desulfurized feedstock will be less than about 1 ppm-mol. The removal of carbon monoxide from the fuel gas sent to the fuel cell is of key importance.

Carbon monoxide poisoning of the fuel cell membranes will result in the reduction of the electrical output of the fuel cell. The catalyst of the present invention is effective in reducing carbon monoxide from feedstock concentrations ranging from about 100 to about 10,000 ppm-vol to provide a treated product stream comprising less than about 50 ppm carbon monoxide. Preferably, the treated product stream comprises between about 1 ppm-vol and about 50 ppm-vol carbon monoxide. More preferably, the treated product stream comprises less than about 10 ppm-vol carbon monoxide.

An essential feature of the present invention involves the use of a catalytic composite comprising a combination of catalytically effective amounts of a ruthenium component with a porous carrier material having a low density and a high porosity. Catalytically effective amounts of ruthenium metal at an effective preferential oxidation temperatures between about 70° and about 160° C. were found to range between about 0.5 and about 10 wt-% ruthenium metal on the catalyst of the present invention. It was discovered that when the preferential oxidation catalyst of the present invention contained ruthenium in amounts ranging from about 0.5 to about 5 wt-% ruthenium metal, and more particularly, containing ruthenium in amounts between about 1 and about 3 wt-% ruthenium metal, the preferential oxidation reaction could be effectively conducted at temperatures below 160° C., and even below 140° C. Preferably, the preferential oxidation conditions include a preferential oxidation temperature between 70° and about 130° C. and a preferential oxidation pressure of between about 7 and about 250 kPa (1 to about 30 psia).

Considering first the porous carrier material utilized in the present invention, it is preferred that the material be a porous, adsorptive, high surface area support having a surface area of about 25 to about 500 m$^2$/gm. The porous carrier material should be relatively refractory to the conditions utilized in the preferential oxidation process, and it is intended to include within the scope of the present invention carrier materials which have traditionally been utilized in hydrocarbon conversion catalysts such as: (1) activated carbon, coke, or charcoal; (2) silica or silica gel, silicon carbide, clays, and silicates including those synthetically prepared and naturally occurring, which may or may not be acid treated, for example, Attapulgus clay, china clay, diatomaceous earth, fuller's earth, kaolin, kieselguhr, etc.; (3) ceramics, porcelain, crushed firebrick, bauxite; (4) refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silica-zirconia, etc.; (5) crystalline aluminosilicates such as naturally occurring or synthetically prepared mordenite and/or faujasite, either in the hydrogen form or in a form which has been treated with multivalent cations; and, (6) combinations of these groups. The preferred porous carrier materials for use in the present invention are refractory inorganic oxides, with best results obtained with an alumina carrier material. Suitable alumina materials are the crystalline aluminas known as the gamma-, eta-, and theta-alumina with gamma- or eta-alumina giving best results. In addition, in some embodiments, the alumina carrier material may contain minor proportions of other well known refractory inorganic oxides such as silica, zirconia, magnesia, etc.; however, the preferred support is substantially pure gamma- or eta-alumina. Preferred carrier materials have an apparent bulk density of about 0.3 to about 0.7 gm/cc, an average pore diameter of about 20 to 3000 angstroms, a pore volume of about 0.1 to about 2.5 ml/gm, and a surface area of about 100 to about 500 m$^2$/gm.

The preferred alumina carrier material may be prepared in any suitable manner and may be synthetically prepared or naturally occurring. Whatever type of alumina is employed, it may be activated prior to use by one or more treatments including drying, calcination, steaming, etc., and it may be in a form known as activated alumina, activated alumina of commerce, porous alumina, alumina gel, etc. For example, the alumina carrier may be prepared by adding a suitable alkaline reagent, such as ammonium hydroxide to a salt of aluminum such as aluminum chloride, aluminum nitrate, etc., in an amount to form an aluminum hydroxide gel which upon drying and calcining is converted to alumina. The alumina carrier may be formed in any desired shape such as spheres, pills, cakes, extrudates, powders, granules, etc., and utilized in any desired size. For the purpose of the present invention, a particularly preferred form of alumina is the sphere; and alumina spheres may be continuously manufactured by the well-known oil drop method which comprises forming an alumina hydrosol by any of the techniques taught in the art and preferably by reacting aluminum metal with hydrochloric acid, combining the resulting hydrosol with a suitable gelling agent and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 300° F. (149° C.) to about 400° F. (204° C.) and subjected to a calcination procedure at a temperature of about 850° F. (454° C.) to about 1300° F. (704° C.) for a period of about 1 to about 20 hours. It is also a good practice to subject the calcined particles to a high temperature steam treatment in order to remove as much as possible of undesired acidic components. This manufacturing procedure effects conversion of the alumina hydrogel to the corresponding crystalline gamma-alumina. See the teachings of U.S. Pat. No. 2,620,314 for additional details.

Superior performance of the catalyst of the present invention was achieved when the porous alumina carrier material comprised a low density and a high porosity. By the term "high porosity", it is meant that the average pore size of the porous alumina carrier material comprised an average pore diameter of from about 20 to about 3000 angstroms, and it was preferred that at least a portion of the porous alumina carrier comprised an average pore size of about 800 to 1500 angstroms. The more preferred porous alumina carrier material comprised a bimodal pore diameter distribution. By the term "bimodal pore diameter distribution", it is meant that the porous carrier has two pore diameter size peak distributions. The most preferred porous alumina carrier material comprised a bimodal pore diameter distribution having a first peak distribution about an average pore diameter of between 70 and 100 angstroms, and a second peak distribution about an average pore diameter of between 1000 and 1500 angstroms. It was surprisingly discovered that porous carrier materials with a more typical unimodal pore diameter of about 70 to 100 angstroms, but not having any portion of the porous alumina carrier comprising a peak distribution with an average pore size greater than 800 angstroms did not achieve the performance of the present invention. A comparison of the materials with unimodal and with bimodal pore diameter distributions is shown in Table 1. Table 1 shows the percent of total pore volume range as a function of the pore diameter size range of a unimodal material, A, with an average pore diameter in the 70–100 angstrom range, compared to the preferred bimodal material, B, of the present invention. The unimodal material is characteristic of typical amorphous refractory oxide support materials employed in the preparation of catalysts as shown in U.S. Pat. No. 5,494,568 and hereby incorporated by reference. The percentage of the total pore volume was based on the pore diameter of samples determined by well-known mercury porosymmetry analysis.

TABLE 1

Carrier Pore Size Distribution

| Pore Diameter, Å | A Percent of Total Pore Volume | B Percent of Total Pore Volume |
|---|---|---|
| 30–91 | 4.41 | 4.98 |
| 101–152 | 25.30 | 4.93 |
| 162–192 | 5.08 | 2.06 |
| 202–253 | 1.04 | 2.89 |
| 262–293 | 0.25 | 1.74 |
| 303–404 | 0.33 | 5.26 |
| 456–556 | 0 | 4.88 |
| 607–758 | 0 | 8.95 |
| 808–910 | 0 | 10.06 |
| 959–1013 | 0 | 12.67 |
| 1213–2108 | 0 | 3.12 |
| 2423–3533 | 0 | 0.40 |
| 5014–9090 | 0 | 0.10 |

An unusual feature of the present invention is the character of the ruthenium metal on the porous refractory oxide carrier. In fact, when the same amount of ruthenium was separately combined with a bimodal carrier material and a unimodal carrier in the same manner, it was surprisingly discovered that the conversion of carbon monoxide was almost two times greater for the bimodal carrier than the unimodal carrier material.

To prepare the preferred catalyst, the support material is compounded with one or more precursors of catalytically active ruthenium metal to prepare an impregnated catalyst. The impregnated catalyst is then dried in air at a temperature of about 100° to about 120° C. for a period of from about 15 minutes to about 4 hours. The dried impregnated catalyst is purged with nitrogen and then reduced at a reduction temperature of about 300° to 500° C. in a reducing atmosphere for a period of about 0.5 to about 2 hours. Typical catalyst preparation steps comprised an oxidation step at an elevated temperature followed by a reduction step at an elevated temperature. It was discovered that by using an oxidation temperature below about 500° C., carbon monoxide conversions of greater than 90 percent in hydrogen-rich streams could be achieved. In addition, it was discovered that the elimination of the oxidation step in the preparation of the preferential oxidation catalyst of the present invention resulted in the more uniform dispersion of the ruthenium metal on the carrier material. Evidence of this improved dispersion of the ruthenium metal was derived from X-ray diffraction (XRD) measurements. Table 2 shows the influence of the catalyst finishing conditions on the XRD results. Table 2 presents a summary of ruthenium crystal sizes calculated from the line width measurements of the diffraction lines characteristic of ruthenium metal. Large particles were observed in all cases where an oxidation step was employed and showed significantly larger ruthenium crystals than when the oxidation step was eliminated.

TABLE 2

Influence of Finishing Conditions X-Ray Diffraction Results

| Preparation Procedure Oxidation Temp/ Reduction Temp | | Calculated Ru Crystallite Sizes: Reflection | | |
|---|---|---|---|---|
| (Example No.) | % Ru | (002) | (101) | (211) |
| 500°/500° C. (III) | 2.10 | 130 | 152 | 122 |
| 300°/500° C. (II) | 2.34 | 139 | 147 | 135 |
| 300°/300° C. (IV) | 2.29 | 84 | 83 | 107 |
| None/500° C. (I)* | 2.65 | ***** | ***** | ***** |
| None/300° C. (IA)* | 2.63 | ***** | ***** | ***** |

*No observable Ru crystallites in catalysts reduced at 500° C. without oxidation.

In the preparation of the preferential oxidation catalyst, a number of ruthenium compounds such as ruthenium nitrate, ruthenium chloride, ruthenium iodide, ruthenium chloride, and the like are useful for impregnation of the alumina carrier material. Preferred compounds include ruthenium nitrosyl nitrate, ruthenium carbonate, etc. It is most preferred to employ ruthenium nitrosyl nitrate solution in amounts effective to provide about 0.5 up to about 10 wt-% of a component as ruthenium metal on the alumina carrier material. More preferably, the finished preferential oxidation catalyst comprises about 0.5 to about 5 wt-% ruthenium metal, and most preferably, the finished preferential oxidation catalyst comprises about 1.5 to about 3 wt-% ruthenium metal. The ruthenium dispersion on the carrier material can be achieved by impregnation techniques well known in the art. For example, the impregnation may be accomplished by spray impregnation wherein a solution containing the metal precursor in dissolved form is sprayed onto the carrier particles. Another method is the circulation or multi-dip method wherein the carrier material is repeatedly contacted with the impregnating solution. Following the ruthenium dispersion step, the sample preparation included an oxidation step followed by a reduction step. Some samples were preparation without an oxidation step prior to the reduction step. Surprisingly, essentially no XRD pattern characteristic of ruthenium component was observed from samples which were reduced without a prior oxidation step indicating that the ruthenium crystal size in the preferred catalyst was below the minimum size of 40 angstroms, which is observable by XRD methods. Further analysis by electron microscopy showed the ruthenium component to be present as well-dispersed crystallites in the reduced-only samples, having ruthenium metal of an average crystallite size of about 10 angstroms. A further benefit was observed by employing a reduction temperature between about 300° and 500° C. Preferably, the reduction temperature employed ranges between about 400° and 500° C.

The preferred ruthenium catalyst of the invention provides greater sustainable carbon monoxide conversion for an equivalent amount of ruthenium than comparative ruthenium-containing catalysts. Other physical properties of the final catalyst of the present invention include a total pore volume of about 0.1 to about 2.5 cc/gram, and preferably about 0.3 to about 1.8 cc/gram, and an apparent bulk density between about 0.2 and about 0.7, and preferably a density between about 0.2 and about 0.4 grams/cc.

The catalyst of the present invention may be employed in a finishing step in the production of a fuel gas for a fuel cell to reduce the carbon monoxide in this fuel gas and thereby minimize damage or extend the life of PEM fuel cells. Catalyst of the present invention also may be employed in any of several conversion processes including steam reforming and water gas shift processes.

Optionally, the catalyst may also contain other, additional components or mixtures thereof which act alone or in concert as catalyst modifiers to improve catalyst activity, selectivity or stability. Some well-known catalyst modifiers include antimony, arsenic, beryllium, bismuth, cadmium, calcium, chromium, cobalt, copper, gallium, gold, indium, iron, lithium, magnesium, manganese, molybdenum, nickel, potassium, rhenium, scandium, silver, sodium, tantalum, thallium, titanium, tungsten, uranium, zinc, and zirconium. These additional components may be added in any suitable manner to the carrier material during or after its preparation or they may be added in any suitable manner to the catalytic composite either before, while, or after other catalytic components are incorporated.

The invention is further illustrated by the following examples which are illustrative of specific modes of practicing the invention and are not intended as limiting the scope of the invention defined in the claims.

EXAMPLES

Example I (Reduction at 500° C.—No Oxidation Step)

A 400-cc aliquot of the bimodal alumina support as characterized in Table 1 as "B" as spheres or extrudates weighing 120 g was introduced into a rotary evaporator. A solution composed of 247 g of ruthenium (III) nitrosyl nitrate solution containing 1.5% ruthenium was diluted with 153 g of deionized water and added to the alumina support in a jacketed rotary evaporator. The support and solution were kept at room temperature in the rotating apparatus for about 15 minutes. Steam was introduced into the jacket of the rotary evaporator for a period sufficiently long so as to allow free-flow of the impregnated catalyst spheres (or extrudates). This period lasted for approximately 4 hours.

The impregnated catalyst was placed in a quartz tube surrounded by a ceramiclined tube furnace and a flow of air was introduced to the tube at ambient temperature and at a flow rate of 6L/min for a period of about 15 minutes. The temperature was raised at 5° C./min to about 110° C. and held there for about 2 hours with the same constant air flow. The air flow was shut off and a nitrogen purge was commenced at a flow rate of 1 L/min at 110° C. for 30 minutes. The nitrogen flow was terminated and a hydrogen flow was introduced over the impregnated catalyst at a rate of 3L/min. The temperature was raised at a rate of 5° C./min to 500° C. while continuing hydrogen flow. The temperature was then maintained at 500° C. for a period of 1 hour. Hydrogen flow was stopped and nitrogen introduced as the temperature was slowly brought down to room temperature.

Example II (Reduction @ 500° C. Following Oxidation @ 300°C.)

A 400-cc aliquot of bimodal alumina support as characterized in Table 1 as "B" as spheres or extrudates weighing 120 g was introduced into a rotary evaporator. A solution composed of 247 g of ruthenium (III) nitrosyl nitrate solution containing 1.5% ruthenium was diluted with 153 g of deionized water and added to the alumina support in a jacketed rotary evaporator. The support and solution were maintained at room temperature in the rotating apparatus for about 15 minutes. Steam was introduced into the jacket of the rotary evaporator for a period sufficiently long as to allow free-flow of the impregnated catalyst spheres or extrudates. This period lasted for approximately 4 hours.

The impregnated catalyst was placed in a quartz tube surrounded by a ceramic-lined tube furnace and a flow of air was introduced to the tube at ambient temperature and at a flow rate of 6L/min for a period of about 15 minutes. The temperature was then raised at 5° C./min to 300° C. under a continuing flow of air. The air flow was shut off and a nitrogen purge was commenced at a flow rate of 1 L/min and maintained for approximately 30 minutes. The nitrogen flow was terminated and a hydrogen flow was introduced over the catalyst at a rate of 3L/min. The temperature was raised at a rate of 5° C./min to 500° C. while continuing hydrogen flow. The temperature was maintained at about 500° C. for a period of about 1 hour. Hydrogen flow was stopped and nitrogen introduced as the temperature was slowly reduced to room temperature.

Example III (Oxidation and Reduction @ 500° C.)

A 400-cc aliquot of the "B" (see Table 1) alumina support spheres or extrudates weighing 120 g was introduced into a rotary evaporator. A solution composed of 247 g of ruthenium (III) nitrosyl nitrate solution containing 1.5% ruthenium was diluted with 153 g of deionized water and added to the alumina support in a jacketed rotary evaporator. The support and solution were kept at room temperature in the rotating apparatus for 15 minutes. Steam was introduced into the jacket of the rotary evaporator for a period sufficiently long so as to allow free-flow of the impregnated catalyst spheres or extrudates (approximately 4 hours).

The impregnated catalyst was placed in a quartz tube surrounded by a ceramic-lined tube furnace and a flow of air was introduced to the tube at ambient temperature and at a flow rate of 6L/min for a period of about 15 minutes. The temperature was raised at 5° C./min to about 500° C. under a continuing flow of air. The air flow was terminated and a nitrogen purge was commenced at a flow rate of 1 L/min and maintained for approximately 30 minutes. The nitrogen flow was stopped and a hydrogen flow was introduced over the catalyst at a rate of 3L/min. The temperature was maintained at 500° C. for a period of 1 hour. Hydrogen flow was stopped and nitrogen was introduced as the temperature was slowly brought down to room temperature.

Example IV (Oxidation and Reduction @ 300° C.)

A 400-cc aliquot of "B" (see Table 1) alumina support spheres (or extrudates) weighing 120 g was introduced into a rotary evaporator. A solution composed of 247 g of ruthenium (III) nitrosyl nitrate solution containing 1.5% ruthenium was diluted with 153 g of deionized water and added to the alumina support in a jacketed rotary evaporator.

The support and solution were kept at room temperature in the rotating apparatus for 15 minutes. Steam was introduced into the jacket of the rotary evaporator for a period sufficiently long so as to allow free-flow of the impregnated catalyst spheres or extrudates (approximately 4 hours).

The impregnated catalyst was placed in a quartz tube surrounded by a ceramic-lined tube furnace and a flow of air was introduced to the tube at ambient temperature and at a flow rate of 6L/min for a period of about 15 minutes. The temperature was raised at 5° C./minute to about 300° C. under a continuing flow of air. The air flow was shut off and a nitrogen purge was commenced at a flow rate of 1 L/min and maintained for approximately 30 minutes. The nitrogen flow was stopped and a hydrogen flow was introduced over the catalyst at a rate of 3L/min. The temperature was then maintained at 300° C. for a period of 1 hour. Hydrogen flow was then stopped and nitrogen was introduced as the temperature was slowly brought down to room temperature.

Comparative Example V (Testing Example)

3-ml Samples of the catalyst of Examples I–IV with nominally 3 wt-% ruthenium and a sample (IA) prepared according to Example I, but reduced at 300° C., were each separately diluted with a blank alumina support to a final volumetric ratio of 3:1 placed in a reactor and purged with nitrogen at a flow rate of 300 ml/min. The reactor was then heated to a temperature of 80° C. where the feed gas mixture shown in Table 3 was then introduced over the catalyst at a flow rate equivalent to a gas hourly space velocity (GHSV) of 10,000 v/v $hr^{-1}$.

TABLE 3

Feed Gas Over PREFOX Catalyst, Mol-%

| | |
|---|---|
| $CO_2$ | 11.98 |
| CO | 0.47 |
| $CH_4$ | 2.96 |
| Ne | 5.05 |
| $H_2$ | 46.84 |
| $O_2$ | 1.06 |
| $N_2$ | 4.02 |
| $H_2O$ | 27.62 |
| Total | 100.00 |

The reactor was heated to a temperature of about 108° C. This condition was maintained for a period of approximately 45 minutes while the effluent levels of CO, $CO_2$, $CH_4$, and $O_2$ were monitored. The temperature was lowered to 90° C. and the catalyst was maintained at this temperature for approximately 120 minutes. The catalysts of Examples I–IV and IA were then compared under these conditions for their ability to convert CO to $CO_2$ and the results are shown in Table 4.

TABLE 4

Results with 3% Ru on Bimodal Alumina Base (Undiluted Testing Condition)

| Example | Oxidation Temp (° C.) | Reduction Temp (° C.) | CO Conversion (90° C.) 5,000 $hr^{-1}$ | $O_2$ mol Selectivity to $CO_2$ (90° C.) 5,000 $hr^{-1}$ |
|---|---|---|---|---|
| | Preparation Procedure | | | |
| I | ***** | 500° | 96.2 | 47 |
| IA | ***** | 300° | 100 | 27.7 |
| II | 300° | 500° | 96 | 84.4 |
| III | 500° | 500° | 87.1 | 67.4 |
| IV | 300° | 300° | 94.5 | 61.4 |

Comparative Example VI

A sample of ruthenium catalyst was prepared according to the procedure of Example I with a catalyst carrier having the properties of the "A" material shown in Table 1, referred to herein as VI-A and another sample prepared by the method of Example I with the "B" carrier material and referred to herein as VI-B. A comparison of the preferential oxidation as described in Example V was made for these materials and the results are shown in Table 5 for a range of space velocities from 5,000 $hr^{-1}$ to 10,000 $hr^{-1}$ at a temperature of about 90° C.

TABLE 5

CO Conversion and O Selectivity

| Example | CO Conversion (90°) 5,000 $hr^{-1}$ | $O_2$ mol Selectivity to $CO_2$ (90°) 5,000 $hr^{-1}$ | CO Conversion (90°) 10,000 $hr^{-1}$ | $O_2$ mol Selectivity to $CO_2$ (90°) 10,000 $hr^{-1}$ | Ru, % |
|---|---|---|---|---|---|
| VI-A | 43.1 | 53.4 | 12.3 | 57.1 | 2.59 |
| VI-B | 98.6 | 40.5 | 73.1 | 54.4 | 2.58 |

The VI-B sample, prepared according to essentially the same procedure as VI-A and containing the same amount of ruthenium with a base having bimodal pore distributions showed a significant advantage in CO conversion on the VI-A sample.

We claim:

1. A process for the generation of a hydrogen-rich fuel gas stream for use in a fuel cell for the generation of electric power, said process comprising:

a) passing a feed stream comprising a hydrocarbon or an oxygenate to a fuel processor comprising an integrated reforming and water gas shift conversion zone to produce a fuel stream comprising hydrogen, carbon monoxide, carbon dioxide and water;

b) passing the fuel stream at an oxidation temperature between 70° and less than 160° C. in the presence of an oxygen-containing stream to a preferential oxidation zone containing a preferential oxidation catalyst to produce the hydrogen-rich fuel gas stream comprising less than about 50 ppm-vol carbon monoxide, said preferential oxidation catalyst consisting of ruthenium metal dispersed on an alumina carrier having an apparent bulk density of about 0.2 to about 0.4 g/cc and wherein at least a portion of said alumina carrier has an average pore size of about 800 to about 1500 angstroms; and c) passing the hydrogen-rich fuel gas stream to a fuel cell for the generation of electric power and withdrawing electric power.

2. The process of claim 1 wherein the hydrogen-rich fuel stream comprises from about 100 to about 3000 ppm-vol carbon monoxide.

3. The process of claim 1 wherein the alumina carrier comprises at least one peak distribution about an average pore diameter between about 800 and about 1500 angstroms.

4. The process of claim 1 wherein the alumina carrier comprises a bimodal pore distribution.

5. The process of claim 4 wherein the alumina carrier comprises a bimodal pore distribution having a first peak having an average pore diameter between about 70 and 100 angstroms and a second peak having an average pore diameter between about 800 and 1500 angstroms.

6. The process of claim 1 wherein the preferential oxidation catalyst comprises about 0.5 to about 10 wt-% ruthenium metal.

7. The process of claim 1 wherein the preferential oxidation catalyst comprises about 0.5 to about 3 wt-% ruthenium metal.

8. The process of claim 1 wherein the ruthenium metal comprises crystals having a crystal size less than about 40 angstroms.

9. The process of claim 1 wherein the ruthenium metal comprises crystals having a crystal size less than about 10 angstroms.

10. The process of claim 1 wherein the oxidation temperature ranges between about 70° and about 130° C.

11. The process of claim 1 wherein the alumina carrier comprises a pore volume from about 0.1 to about 2.5 milliliters/gram.

12. A preferential oxidation process for the conversion of carbon monoxide comprising passing a fuel stream comprising hydrogen, carbon monoxide, carbon dioxide and water in the presence of an oxygen-containing stream at oxidation conditions including a preferential oxidation temperature less than 160° C. to a preferential oxidation zone containing a preferential oxidation catalyst comprising an alumina carrier having an apparent bulk density of from about 0.2 to about 0.4 g/cc and a pore diameter having a first peak having an average pore diameter of between about 70 and 100 angstroms and a second peak having an average pore diameter of between about 800 and about 1500 angstroms, said alumina carrier containing ruthenium metal having an average crystal size less than or equal to about 40 angstroms and withdrawing a treated fuel stream comprising less than about 50 ppm-vol carbon monoxide.

* * * * *